US012475550B2

(12) United States Patent
Strüber et al.

(10) Patent No.: US 12,475,550 B2
(45) Date of Patent: Nov. 18, 2025

(54) TRAVELLING GRATE CONDITION MONITORING

(71) Applicant: PAUL WURTH S.A., Luxembourg (LU)

(72) Inventors: Georg Strüber, Frisange (LU); David Navez, Saint-Pierre (BE); Pierre Van Dorpe, Arlon (BE)

(73) Assignee: PAUL WURTH S.A., Luxembourg (LU)

( * ) Notice: Subject to any disclaimer, the term of this patent is extended or adjusted under 35 U.S.C. 154(b) by 361 days.

(21) Appl. No.: 17/631,545

(22) PCT Filed: Jul. 22, 2020

(86) PCT No.: PCT/EP2020/070729
§ 371 (c)(1),
(2) Date: Jan. 31, 2022

(87) PCT Pub. No.: WO2021/018703
PCT Pub. Date: Feb. 4, 2021

(65) Prior Publication Data
US 2022/0277433 A1 Sep. 1, 2022

(30) Foreign Application Priority Data
Jul. 30, 2019 (LU) ........................... 101334

(51) Int. Cl.
G06K 9/00 (2022.01)
F27B 21/06 (2006.01)
F27D 3/12 (2006.01)
F27D 21/00 (2006.01)
G06F 16/583 (2019.01)
G06T 7/00 (2017.01)

(52) U.S. Cl.
CPC .............. G06T 7/001 (2013.01); F27B 21/06 (2013.01); F27D 3/123 (2013.01); F27D 21/00 (2013.01); G06F 16/583 (2019.01); G06T 2207/30136 (2013.01)

(58) Field of Classification Search
CPC ..................................................... G06T 7/001
See application file for complete search history.

(56) References Cited

U.S. PATENT DOCUMENTS

| | | | | |
|---|---|---|---|---|
| 6,523,673 B1 * | 2/2003 | Fenton, Jr. | ............. | F27B 21/06 |
| | | | | 198/465.1 |
| 11,549,159 B2 * | 1/2023 | Kinzel | ....................... | C21B 5/00 |
| 2014/0021016 A1 * | 1/2014 | Schulakow-Klass | ... | F27D 3/123 |
| | | | | 198/712 |
| 2020/0041207 A1 * | 2/2020 | Schulakow-Klass | ... | F27D 3/123 |

FOREIGN PATENT DOCUMENTS

| | | | | |
|---|---|---|---|---|
| AP | N16603 | * | 11/2015 | |
| CA | 2304915 A1 | * | 5/2001 | ............. B65G 35/08 |
| CN | 105115301 B | * | 3/2017 | |
| CN | 109975040 A1 | * | 7/2019 | ............. G01M 17/10 |
| EP | 2231885 A1 | * | 9/2010 | ............. C07D 471/04 |
| EP | 2231885 B1 | * | 9/2010 | ............. C07D 471/04 |
| EP | 3348942 A1 | * | 7/2018 | ............. F27B 9/262 |
| JP | H04276030 A | | 10/1992 | |
| JP | H07110193 A | | 4/1995 | |
| JP | H07260366 A | | 10/1995 | |
| JP | 2000154927 A | * | 6/2000 | |
| JP | 2000154972 A | * | 6/2000 | |
| JP | 2014009853 A | | 1/2014 | |
| OA | N16603 | * | 11/2015 | |
| WO | WO-2009087101 A1 | * | 7/2009 | ............. G01B 11/14 |
| WO | 2011108532 A1 | | 9/2011 | |

OTHER PUBLICATIONS

Automotive Diagnostics as a Service: An Artificially Intelligent Mobile Application for Tire Condition Assessment, Joshua E. Siegel et al., Springer, 2018, pp. 172-184 (Year: 2018).*
Automated Visual Inspection System for Bogie Block Key Under Complex Freight Train Environment, Liu Liu et al., 2015, pp. 1-13 (Year: 2015).*
Automated visual inspection of target parts for train safety based on deep learning, Fugiang Zhou et al., IET, 2018, pp. 550-555 (Year: 2018).*
Automatic multi-fault recognition in TFDS based on convolutional neural network, Junhua Sun et al., 2016, pp. 127-136 (Year: 2016).*
An Online System for Detecting Bending in a Pallet Car, Ahmad Pouramini et al, IJOCA, 2016, pp. 1-5 (Year: 2016).*
Onboard Condition Monitoring Sensors, Systems and Techniques for Freight Railway Vehicles: A Review, Esteban Bernal et al., IEEE, Jan. 2019, pp. 4-23 (Year: 2019).*
International Search Report for corresponding application PCT/EP2020/070729 filed Jul. 22, 2020; Mail date Sep. 23, 2020.

(Continued)

*Primary Examiner* — Jayesh A Patel
(74) *Attorney, Agent, or Firm* — CANTOR COLBURN LLP

(57) ABSTRACT

A system and method for monitoring the condition of a travelling grate machine including univocally identifying each pallet car; collecting a plurality of condition indicating parameters for the wheels, the grate bars, the car body and/or the side walls of the pellet car; attributing the collected condition indicating parameters to an individual pallet car; storing the collected condition indicating parameters for each pallet car in a database; evaluating the condition of the travelling grate machine; comparing the different condition indicating parameters collected by the different sensor means of each pallet car to reference parameters and/or to previously collected condition indicating parameters of that same pallet car; identifying the faults in each pallet car based on this comparison; classifying each pallet car according to its need of maintenance based on the severity of different identified faults; and determining the pallet car in most need of maintenance based on this classification.

11 Claims, No Drawings

(56) References Cited

OTHER PUBLICATIONS

Written Opinion for corresponding application PCT/EP2020/070729 filed Jul. 22, 2020; Mail date Sep. 23, 2020.
International Preliminary Report on Patentability for corresponding application PCT/EP2020/070729 filed Jul. 22, 2020; Mail date Oct. 22, 2021.
Japanese Office Action for corresponding application P2022-505635; Mail date Jul. 2, 2024.

* cited by examiner

TRAVELLING GRATE CONDITION MONITORING

TECHNICAL FIELD

The disclosure generally relates to a system and method for monitoring the condition of a travelling grate, in particular a travelling grate of a pelletizing or sintering machine. The system and method is of particular interest for predictive maintenance operations.

BACKGROUND

Travelling grate machines are generally well known in sintering or pelletizing plants, wherein bulk material is subjected to thermal treatment. Travelling grate machines comprise a plurality of pallet cars which receive bulk material from a feed means. The pallet cars travel on a horizontally extending top strand through at least one treatment station wherein process gas, for example air, is vertically fed through the pallet car and through the bulk material. At the end of the upper strand, the thermally treated bulk material is dumped by gravity from the pallet cars, which then travel upside-down back to the front end of the travelling grate machine. One example of such a travelling grate machine may be seen in U.S. Pat. No. 6,523,673.

Pallet cars have a perforate floor made up of individual grate bars having spaces therebetween to permit the passage of process gas, either in a downward direction or in an upward direction, depending on the type of treatment station. The process gas passes through the perforate floor and through the bulk material. The pallet cars are made up of a car body upon which the grate bars are fitted. Side walls are located at each transversely spaced side of the pallet cars to prevent spillage of the bulk material outwardly from the sides of the pallet cars. Each pallet car further has wheels for riding on guide rails along the travelling grate machine so that the individual pallet cars are in an abutting relationship to form a continuous moving perforate floor for the bulk material.

Due to the severe environment of the travelling grate machine, routine maintenance is required on the pallet cars. The grate bars, in particular, suffer a lot of damage and thus need replacement in order not to negatively impact on the process of thermally treating bulk material.

Solutions have been developed to monitor the condition of the perforate floor of the pallet cars. Amongst the solutions known in the art, JP 2000 154972 A discloses an apparatus for identifying pallet cars missing a grate bar or presenting a broken grate bar.

Another solution is disclosed in EP 2 231 885 A1. This document presents a system and a method for monitoring the deformation, in particular deflection, of the crossbeams of a pallet car. Pallet cars needing maintenance are identified based on the deformation of the crossbeams, and can possibly be identified before breakage of one crossbeam occurs, so that the identified damaged pallet car can be repaired or replaced during the next maintenance operation.

However, the perforate floor of a pallet car is not the only part that can be damaged and may need maintenance or replacement during operation of a travelling grate machine. Damage can indeed also occur to the side walls or the car body of the pallet car. The wheels of the pallet car are also at risk of being damaged.

BRIEF SUMMARY

The disclosure provides a system and method for monitoring the condition of a travelling grate machine, with an improved monitoring of the condition of the travelling grate machine and, in particular, of its individual pallet cars.

The present disclosure relates to a system for monitoring the condition of a travelling grate machine, in particular a pelletizing or sintering machine, wherein the travelling grate machine comprises a plurality of pallet cars comprising a car body with wheels, side walls and a perforate floor with a plurality of grate bars. According to the present disclosure, the system comprises identification means for univocally identifying each pallet car; sensor means for collecting a plurality of condition indicating parameters; processor means for attributing the collected condition indicating parameters to an individual pallet car; storage means for storing the collected condition indicating parameters for each pallet car in a database; and evaluation means for evaluating the condition of the travelling grate machine.

The sensor means comprises sensor means for collecting parameters indicative of the condition of the wheels of the pallet car, sensor means for collecting parameters indicative of the condition of the grate bars of the pallet car, and sensor means for collecting parameters indicative of the condition of the car body and/or side walls of the pallet car.

The evaluation means is configured to compare the different condition indicating parameters collected by the different sensor means of each pallet car to reference parameters and/or to previously collected condition indicating parameters of that same pallet car; to identify the faults in each pallet car based on this comparison; to classify each pallet car according to its need of maintenance based on the severity of different identified faults; and to determine the pallet car in most need of maintenance based on this classification.

The present system thus continuously monitors the condition of individual pallet cars and records the faults detected therewith. Based on the detected faults and their severity, the system classifies the pallet cars in order of maintenance requirement. If important faults are detected that require immediate attention, the system can initiate an emergency stoppage of the travelling grate machine so that the required repairs can be carried out. For less urgent faults, the system prioritizes the pallet cars requiring maintenance, such that pallet cars most in need of maintenance can be replaced or maintenance carried out thereon during the next scheduled maintenance stoppage.

As faults to the pallet cars are continuously identified and monitored, it is not only possible to know which pallet cars require maintenance during a stoppage, but also what repairs are required. Thus, even before the maintenance stoppage takes place, it is possible to prepare the required tools and replacement parts. Stoppage time can thus be reduced, thereby increasing the efficiency of the travelling grate machine.

The continuous monitoring of the faults of individual pallet cars also allows the operator to adapt the operating conditions of the travelling grate machine such that further degradation of the faulty pallet car is reduced or even avoided. This allows prolonging the lifetime of the faulty pallet at least until the next scheduled maintenance stoppage, thereby avoiding an emergency stoppage.

The sensor means preferably comprise contactless sensors, such as e.g. a camera system based on light or laser beams. Such contactless sensors allow collecting the respective condition indicating parameters without actual physical contact with the pallet car. This is of particular interest because the pallet cars are generally moving, while the sensor means are preferably located in a fixed location.

The sensor means allow the capturing of images that can be compared to reference images. Any discrepancy between the captures image and the reference image can be used by the evaluation means for evaluating the condition of the captured part of the pallet car. The captured image is stored in the storage means. This allows a newly captured image to be compared to a previously captured image of the same part of a particular pallet car. The comparison by the evaluation means of successive captured imaged of the same part of a pallet car allows the evaluation of the degradation of that part. Thus, a part that is identified as deteriorated can be monitored more closely to identify the rate of deterioration. This allows predicting when the part needs to be replaced.

Preferably, the parameters indicative of the condition of the wheels of the pallet car allow determining the presence of a wheel and whether or not the wheel rotates. If the evaluation means identifies that a pallet car wheel is missing, the pallet car is classified as requiring immediate attention. The system may initiate an emergency stoppage such that the missing wheel, or even the whole pallet car, can be replaced. If the evaluation means identifies that a pallet car wheel is not rotating or not rotating correctly, the system may classify this fault as high priority such that the pallet car can undergo maintenance during the next scheduled maintenance stoppage, before complete failure of the wheel occurs. If the evaluation means identifies that a pallet car wheel is deteriorated, the system may classify this fault as lower priority and flag the pallet car as requiring closer monitoring to check the progression of the deterioration.

Preferably, the parameters representative of the condition of the grate bars of the pallet car allow determining the presence of grate bars. If grate bars are missing, the system may classify this fault as higher priority depending on how many such grate bars are missing. Missing grate bars have an important impact on the efficiency of the travelling grate machine and thus need urgent attention. Missing grate bars furthermore contribute to a faster deterioration to neighbouring grate bars. Thus, missing grate bars are allocated a high priority such that the pallet car can undergo maintenance during the next scheduled maintenance stoppage, before the pallet car and the efficiency of the travelling grate machine further deteriorate.

Preferably, the parameters representative of the condition of the grate bars of the pallet car further allow determining the size of the gaps between neighbouring grate bars. The larger the gaps, the more material may fall through the perforate floor and the more deterioration may occur to neighbouring grate bars. A localised enlargement of the gap between neighbouring grate bars may also indicate a misalignment of the grate bars. Depending on the how many gaps are detected in a pallet car and on how big these gaps are, the system may classify this fault as higher priority in order to carry out maintenance on the pallet car.

Preferably, the parameters representative of the condition of the grate bars of the pallet car further allow determining the shape, size or orientation of the grate bars of a pallet car. Pallet cars with misshaped, shrunk or misaligned grate bars may be an indication that a more important fault is to be expected. The system may classify such faults with lower priority, i.e. not requiring immediate attention. The pallet cars with such faults may however be more closely monitored. If no pallet cars with higher ranking priority are identified, these pallet cars can be selected for maintenance during the next scheduled maintenance stoppage in order to prevent further deterioration of the pallet car.

Preferably, the parameters indicative of the condition of the car body and/or the side walls of the pallet car allow determining the presence of cracks in either the car body or the side walls. Depending on the number, size and location of such cracks, the system may classify such faults as having higher or lower priority. If the condition is such that the pallet car is in danger of complete failure, a higher priority may be given to that pallet car, thus assigning the pallet car for maintenance during the next scheduled stoppage. If the damage is very important, the system may even initiate an emergency stoppage to replace the pallet car. If, on the other hand, the damage is not significant, the system may classify such faults as having low priority.

The system may also comprise sensor means for determining loosening or overheating of side walls.

According to a preferred embodiment of the disclosure, the system may further comprise sensor means for collecting parameters representative of the condition of the grate bar holders, the bolts, the upper seal and/or the lower seal.

The present disclosure also relates to a method for monitoring the condition of a travelling grate machine, in particular a pelletizing or sintering machine, wherein the travelling grate machine comprises a plurality of pallet cars comprising a car body with wheels, side walls and a perforate floor with a plurality of grate bars. According to the present disclosure, the method comprises univocally identifying each pallet car; collecting a plurality of condition indicating parameters; attributing the collected condition indicating parameters to an individual pallet car; storing the collected condition indicating parameters for each pallet car in a database; and evaluating the condition of the travelling grate machine.

The collection of a plurality of condition indicating parameters comprises collecting parameters indicative of the condition of the wheels of the pallet car, parameters indicative of the condition of the perforate floor of the pallet car and parameters indicative of the condition of the car body and/or the side walls of the pallet car.

Preferably, the parameters indicative of the condition of the wheels of the pallet car allow determining the presence of a wheel and whether or not the wheel rotates. If the evaluation means identifies that a pallet car wheel is missing, not rotating or otherwise deteriorated, the pallet car is classified according to its maintenance need as indicated above.

Preferably, the parameters indicative of the condition of the perforate floor of the pallet car allow determining the presence of grate bars, their shape, size and orientation, their condition and the size of the gap between neighbouring grate bars. If the evaluation means identifies that grate bars are missing or damaged or that the perforate floor is otherwise deteriorated, the pallet car is classified according to its maintenance need as indicated above.

The evaluation comprises comparing the collected condition indicating parameters of each pallet car to reference parameters and/or to previously collected condition indicating parameters of that same pallet car; identifying the faults in each pallet car based on this comparison; classifying each pallet car according to its need of maintenance based on identified faults; and determining the pallet car in most need of maintenance based on this classification.

The method advantageously comprises capturing an image of a part of a particular pallet car, preferably with a camera system; storing the captured image in a database; and evaluating the condition of the travelling grate machine based on the captured image and a reference image or a previously stored image.

According to the disclosure, the method comprises collecting parameters representative of the condition of the car body and/or the side walls of the pallet car, as mentioned above. If the evaluation means identifies that the car body and/or the side walls are damaged, the pallet car is classified according to its maintenance need as indicated above.

According to a preferred embodiment of the disclosure, the method may further comprise collecting parameters representative of the condition of the grate bar holders, the bolts, the upper seal and/or the lower seal. If the evaluation means identifies that these elements are damaged, the pallet car is classified according to its maintenance need as indicated above.

DETAILED DESCRIPTION

A preferred embodiment of the present disclosure will now be described, by way of example.

Travelling grate machines are generally well known. They comprise a plurality of successive pallet cars for carrying bulk material. Each pallet car comprises a car body fitted with wheels for travelling on guide rails. The pallet car further comprises a perforate floor for receiving the bulk material thereon. Sidewalls are provided to prevent the bulk material from falling sideways off the pallet car. The front and rear end of each pallet car is in abutment with another pallet car, thereby forming a receiving surface for the bulk material extending over a number of pallet cars.

The perforate floor of the pallet car is formed by a plurality of grate bars with spaces therebetween to permit the passage of process gas. Such process gas may e.g. be air or any other gas capable of heating or cooling bulk material. The grate bars are positioned such that the gaps therebetween are sufficient to allow process gas to circulate but prevent the bulk material from falling through the gaps. In operation, due to the harsh conditions the travelling grate machines are exposed to, the perforate floor may become damaged. Indeed, individual grate bars can deteriorate. Due to wear and tear, the grate bars may e.g. be misaligned; they may become narrower, break or vanish altogether. Consequently, the gap between neighbouring grate bars is altered. With bigger gaps between grate bars, bulk material is no longer retained on the perforate floor. Also, preferential flow passages for process gas may be formed, leading to uneven thermal treatment of bulk material. Indeed, certain areas of the bulk material and the pallet car may thereby be exposed to excessive heat.

The present disclosure concerns a system and method for continuously monitoring the condition of the pallet cars and for identifying the pallet car most in need of maintenance.

According to a preferred embodiment, a camera system, comprising a number of cameras, is installed preferably just before bulk material is deposited on the pallet cars. This allows the camera to have a clear view of the pallet car and in particular of its perforate floor. Different cameras are preferably provided for monitoring specific areas of the pallet car, such as the wheels, the grate bars and the sidewalls of the pallet car. As a particular pallet car passes the camera system, the identity of that pallet car is first determined. The cameras capture various images of various parts of the pallet car. These captured images are associated with the pallet car identity and subsequently stored in a database. The database comprises reference images for the respective parts and preferably previously captured images of these parts.

Evaluation means are used to compare the newly captured image with the reference image and/or the previously captured image of the respective part to determine the condition of that part. The comparison with the reference image allows determining whether the part is damaged or not; while the comparison with previously captured images allows determining the rate of deterioration.

The evaluation means thus continuously monitors the condition of each pallet car as it passes the camera system and identifies any part that may be faulty. The evaluation means however not only identifies faults with the pallet car; it also classifies the identified faults according to their importance, thereby allowing identification of the urgency of maintenance for each pallet car. Maintenance of the travelling grate machine can thus be prepared and carried out according to a prepared schedule. If critical faults are identified, an emergency stoppage can occur to prevent further damage. If important faults are identified, maintenance can be scheduled to repair the damage or exchange the pallet car before they develop into critical faults. For minor faults, these can be logged and the deterioration of the identified parts can be monitored and action can be taken, preferably during a routine stoppage, before the fault turns into a more important fault requiring unscheduled stoppage.

The camera system is e.g. configured to monitor the number of grate bars, the number of gaps between grate bars, the width of each grate bar, the area of each grate bar, the angle orientation of each grate bar, the width of each grate bar gap, the total area of each gap, the total area of gaps blocked by bulk material. The camera system may further be configured to monitor the area of each wheel, the area of each pressure roller, the area of the sidewall top part, the area of the sidewall bottom part and the area of each head plate.

With respect to the perforate floor, the latter may be divided into separate sections, e.g. four sections, wherein the condition of the grate bars and gaps are captured individually for each such section.

The portion of the travelling grate machine most at risk of being damaged from wear and tear is the perforate floor. Thus, the elements most in need of maintenance are generally the grate bars. Misaligned grate bars and missing grate bars create large gaps between neighbouring grate bars. Such gaps allow bulk material falling through the perforate floor. This not only leads to a loss of bulk material, but also to a risk of preferential flow passages for hot process gas, overheating parts of the pallet car and the travelling grate machine, and a loss in efficiency of the thermal treatment of the bulk material.

Bulk material may become stuck in the gaps between neighbouring grate bars. Generally, such stuck bulk material is liberated when the material is discharged from the pallet car. If, however, the bulk material is not liberated, a build-up of stuck bulk material can occur, which may have a negative impact on the process gas flow through the perforate flow and thus on the efficiency of the thermal treatment of the bulk material.

The system and method of the present continuously monitors the condition of the perforate floors, such as e.g. the number of grate bars, the number of gaps, the width of the grate bars, the area of the grate bars, the angle of orientation of the grate bars, the width of the gap between grate bars, the total area of each gap, the total area of gaps blocked by bulk material. These parameters allow an evaluation of the condition of the perforate floor.

The system can, based on these parameters, identify various faults. It can amongst others identify the number of missing grate bars, the average grate bar width, the number of grate bars with a width below a predefined threshold, the number of gaps with a width above a predetermined width, the degree of gaps blocked, the number of grate bars with a degradation.

Based thereon, the importance of the fault is identified and stored against the particular pallet car. Thus, the system continuously updates the condition of each pallet car and can classify the pallet cars by order of maintenance requirement necessity. Obviously, some faults are more critical than others and therefore have a different weighing in the decision making. Missing grate bars for example are more important a fault than a number of misaligned grate bars.

While most faults are related to the perforate floor of the pallet car, other parts of the pallet car may require maintenance. To this effect, the camera system also monitors the area of the wheels; the area of the pressure rollers, the area of the sidewall top and bottom parts and/or the area of the head plate. Indeed, these parts may also become damaged and potentially require rapid maintenance. Based on these parameters, the system can identify faults such as missing or damaged wheels, missing or damaged pressure rollers, missing or damaged side walls (top and/or bottom parts) and missing or damaged head plates. Some of these faults, such as missing side walls or missing wheels are particularly important and are assigned a higher weighing in the decision making. Such faults may require stoppage of the installation, even before the next scheduled maintenance stoppage, in order to repair or replace the pallet car displaying such faults.

The exact weighing of the different faults may depend on the specific travelling grate machine monitored by the system. They are therefore variables that can be set by the operator.

It should be noted that the system aims to identify faults at an early stage and to monitor the rate of deterioration based on historical images captured each time the pallet car passes the camera system. The monitoring of the rate of deterioration allows predicting when the damaged part must be replaced before the fault becomes critical. Maintenance work can then be scheduled accordingly. Carrying out maintenance work on the pallet cars most in need of repair during a scheduled maintenance stoppage reduces the number of unscheduled emergency stoppages of the travelling grate machine.

The invention claimed is:

1. A system for monitoring a condition of a travelling grate machine, in particular a pelletizing or sintering machine, said travelling grate machine comprising a plurality of pallet cars comprising a car body with wheels, side walls and a perforate floor with a plurality of grate bars, the system comprising:
    identification means for univocally identifying each individual pallet car among the plurality of pallet cars as the plurality of pallet cars traverse the travelling grate machine;
    sensor means for continuously collecting a plurality of condition indicating parameters, as the plurality of pallet cars traverse the travelling grate machine, before performing maintenance or emergency stoppage of the travelling grate machine, wherein said sensor means comprises:
        a first sensor means for collecting first condition indicating parameters indicative of a condition of the wheels of the pallet car;
        a second sensor means for collecting second condition indicating parameters indicative of a condition of the grate bars of the pallet car; and
        a third sensor means for collecting third condition indicating parameters indicative of a condition of the car body and/or side walls of the pallet car;
    processor means for attributing the collected first, second and third condition indicating parameters to the individual pallet car;
    storage means for storing the collected first, second and third condition indicating parameters for the individual pallet car in a database;
    evaluation means executed by the processor means for evaluating the condition of the travelling grate machine as the plurality of pallet cars traverse the travelling grate machine, wherein said evaluation means comprises:
        compares the first, second and third condition indicating parameters collected by the first, second and third sensor means of each pallet car to reference parameters and/or to previously collected condition indicating parameters of that the individual pallet car;
        identifies faults in each pallet car based on this comparison;
        classifies each pallet car according to a need of maintenance based on a severity of the identified faults; and
        determines a damaged pallet car among the plurality of pallet cars having a greatest need of maintenance based on this classification; and
    wherein the processor means controls the travelling grate machine to perform an emergency stoppage that stops the traversing of the plurality of pallet cars in response to determining the damaged pallet car.

2. The system according to claim 1, wherein the first, second and third sensor means comprises contactless sensors.

3. The system according to claim 1, wherein the first, second and third sensor means is configured to capture an image of a part of the pallet car, wherein the storage means is configured to store the captured image and wherein the evaluation means is configured to compare the captured image with a reference image and/or a previously stored image.

4. The system according to claim 1, wherein the system is configured to monitor a presence and/or a rotation of the wheels of the pallet car.

5. The system according to claim 1, wherein the system is configured to monitor a presence of grate bars and/or a size of a gap between neighboring grate bars.

6. The system according to claim 1, wherein the system is configured to monitor a shape and/or a size and/or an orientation of the grate bars of a pallet car.

7. The system according to claim 1, wherein the system is configured to monitor a presence of cracks in the car body and/or the side walls of the pallet car.

8. The system according to claim 1, wherein the system comprises a fourth sensor means for collecting fourth condition indicating parameters indicative of a condition of grate bar holders and/or bolts and/or an upper seal and/or a lower seal.

9. A method for monitoring a condition of a travelling grate machine, in particular a pelletizing or sintering machine, said travelling grate machine comprising a plurality of pallet cars comprising a car body with wheels, side walls and a perforate floor with a plurality of grate bars, the method comprising:
    univocally identifying each individual pallet car among the plurality of pallet cars as the plurality of pallet cars traverse the travelling grate machine;
    continuously collecting a plurality of condition indicating parameters, as the plurality of pallet cars traverse the travelling grate machine, before performing maintenance or emergency stoppage of the travelling grate machine, wherein the collected indicative parameters include:
- first condition indicating parameters indicative of a condition of the wheels of the pallet car;
- second condition indicating parameters indicative of a condition of the perforate floor of the pallet car; and
- third condition indicating parameters indicative of a condition of the car body and/or the side walls of the pallet car;

attributing, by a processor means, the collected condition indicating parameters to the individual pallet car;

storing the collected condition indicating parameters for each pallet car in a database;

performing, by the processor means, an evaluation means for evaluating a condition of the travelling grate machine as the plurality of pallet cars traverse the travelling grate machine, wherein said evaluation means comprises:
- comparing the first, second and third condition indicating parameters of each pallet car to reference parameters and/or to previously collected condition indicating parameters of that same pallet car;
- identifying faults in each pallet car based on this comparison;
- classifying each pallet car according to a need of maintenance based on a severity of the identified faults;
- determining a damaged pallet car among the plurality of pallet cars having a greatest need of maintenance based on this classification; and
- controlling, by the processor means, the travelling grate machine to perform an emergency stoppage that stops the traversing of the plurality of pallet cars in response to determining the damaged pallet car.

10. The method according to claim 9, further comprising:
capturing an image of a pallet car;
assigning a pallet car reference to the captured image;
storing the captured image in a database; and
comparing the captured image with a reference image or a previously stored image.

11. The method according to claim 9, further comprising:
collecting fourth condition indicating parameters representative of a condition of grate bar holders, bolts, an upper seal, and/or a lower seal.

* * * * *